J. E. ROGERS.
VEHICLE WHEEL.
APPLICATION FILED SEPT. 14, 1916.
1,245,513.
Patented Nov. 6, 1917.
3 SHEETS—SHEET 1.
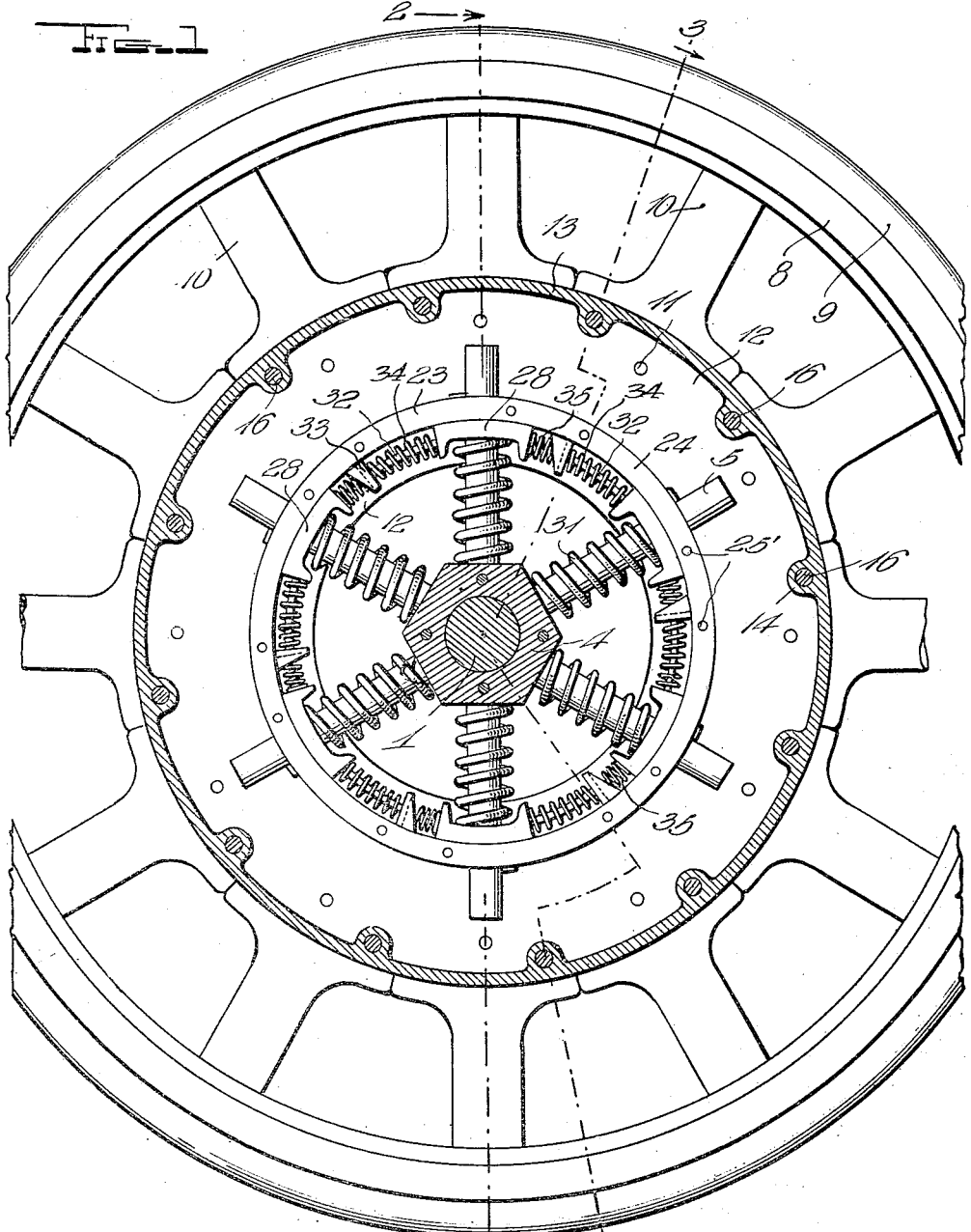
Witness
Inventor
J. E. Rogers
By H. R. Wilson & Co.
Attorneys

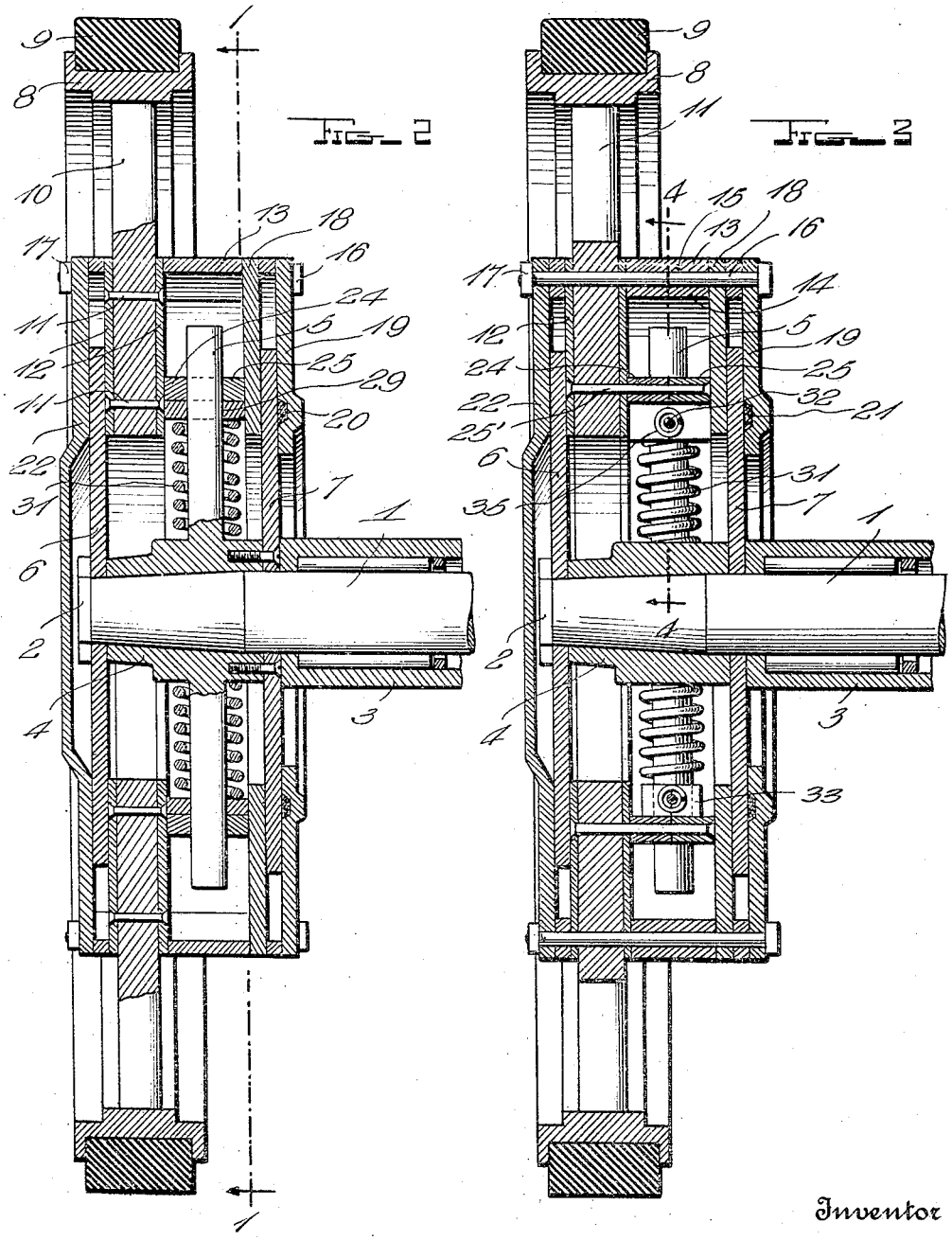

J. E. ROGERS.
VEHICLE WHEEL.
APPLICATION FILED SEPT. 14, 1916.
1,245,513.
Patented Nov. 6, 1917.
3 SHEETS—SHEET 3.
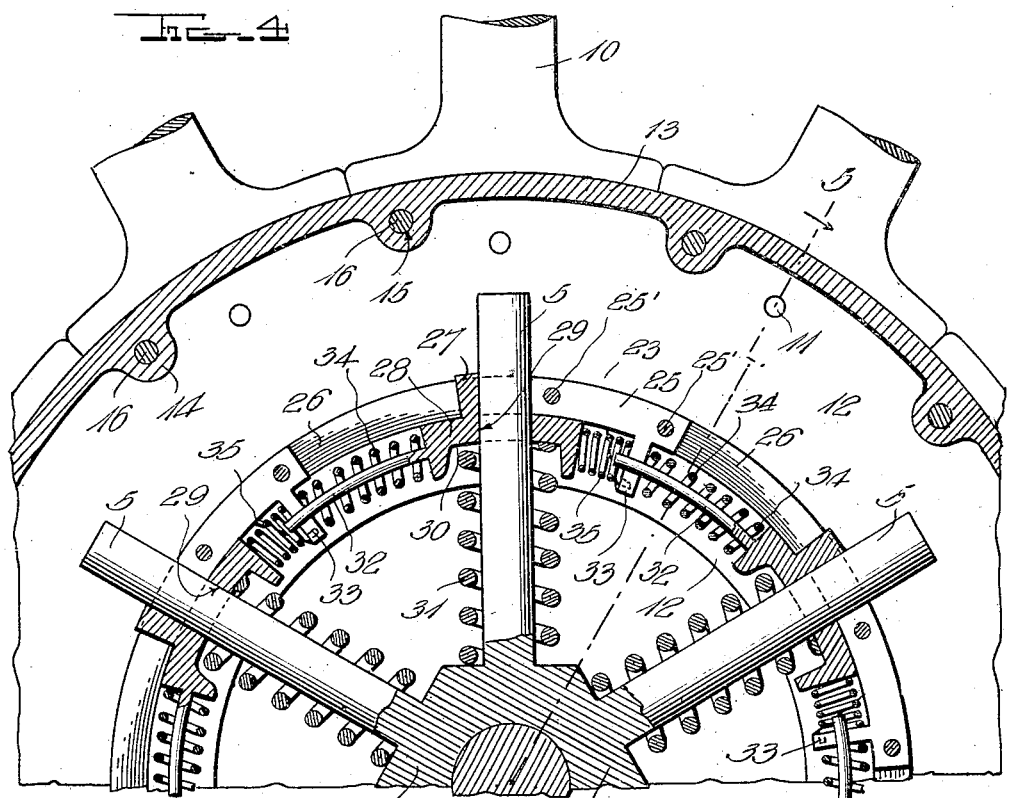
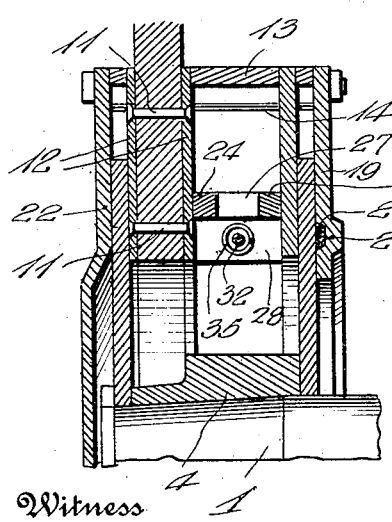
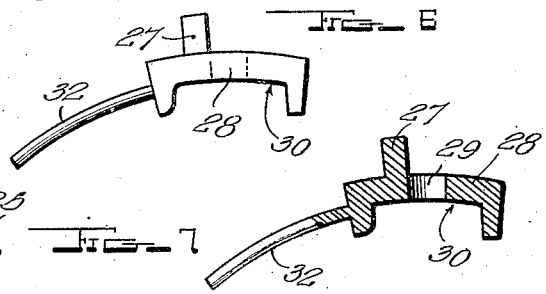
Witness
Inventor
J. E. Rogers
By H. B. Willson & Co.
Attorneys

UNITED STATES PATENT OFFICE.

JAMES EDWARD ROGERS, OF KELLY, COLORADO.

VEHICLE-WHEEL.

1,245,513.

Specification of Letters Patent.

Patented Nov. 6, 1917.

Application filed September 14, 1916. Serial No. 120,086.

*To all whom it may concern:*

Be it known that I, JAMES E. ROGERS, a citizen of the United States, residing at Kelly, in the county of Logan and State of Colorado, have invented certain new and useful Improvements in Vehicle-Wheels; and I do declare the following to be a full, clear, and exact description of the invention, such as will enable others skilled in the art to which it appertains to make and use the same.

This invention relates generally to vehicle wheels, but more particularly to certain new and useful improvements in shock absorbing hubs for vehicle wheels.

The primary object of this invention is to provide a resilient or shock absorbing hub for wheels whereby the strain and jars are taken from the transmission mechanism of the vehicle to which the wheel is applied, as well as from the body of the vehicle.

Another object of the invention is to generally improve upon devices of this character by the provision of a device which will be simple, strong, durable and comparatively inexpensive in construction, efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings, forming part of the application, and in which similar reference characters designate like parts throughout the several views, Figure 1 is a transverse sectional view through a portion of the hub taken substantially on the plane of the line 1—1 of Fig. 2, the spokes and rim of the wheel being shown in elevation;

Fig. 2 is a sectional view through the hub and wheel taken on the plane of the line 2—2 of Fig. 1;

Fig. 3 is a similar view through the hub and wheel taken substantially on the line 3—3 of Fig. 1;

Fig. 4 is an enlarged transverse sectional view through a portion of the hub taken on the plane of the line 4—4 of Fig. 3;

Fig. 5 is a reduced detail sectional view taken on the plane of the line 5—5 of Fig. 4;

Fig. 6 is a side elevation of one of the spring sockets or seats detached from the remaining parts of the hub;

Fig. 7 is a longitudinal section through one of the spring seats or sockets; and Fig. 8 is a plan view of the same.

Referring more particularly to the drawings, the reference numeral 1 designates the axle of a vehicle in connection with which the present invention is designed to be applied. As shown, the free end of the axle 1 is tapered and externally threaded to receive the clamping nut 2, the purpose of which will be hereinafter described. As the wheel is preferably to be employed on motor driven vehicles on the driving axle of such vehicle, the axle 1 is shown surrounded by the usual axle and gear housing 3. This is of any suitable construction and forms no part of the present invention.

Wedged upon the tapered end of the axle 1 by means of the clamping nut 2 is a hub portion 4 having a plurality of spokes 5 extending radially therefrom. As clearly shown by the drawings, these spokes 5 are integrally cast with the hub portion 4. The outer end of this hub portion 4 is reduced in diameter for the purpose of making the device as light as possible, and clamped between the free end of this reduced portion and the clamping nut 2 is a circular plate 6. Bolted to the inner end of the hub portion 4 is another circular plate 7 which is preferably of the same diameter as the plate 6. The purpose of these plates 6 and 7 will appear as the other parts of the invention are specifically described.

The numeral 8 designates the outer rim of the wheel to which a tire 9 of any construction is applied in any convenient manner, and from the inner sides of which extend radially inwardly a plurality of spokes 10. Arranged on both sides of the spokes 10 and secured to the same by means of bolts or rivets 11 are annular plates 12. As shown, the openings through the central portions of the plates 12 allow the hub portion 4 to be inserted through the same and permit it to move eccentrically with respect thereto. Secured to the spokes in the manner presently to be described is a cylindrical member or casing 13. This casing 13 is disposed on the inner side of the wheel and is provided on its interior side with a plurality of circumferentially spaced lugs 14 having transversely extending apertures 15 therein to receive clamping bolts 16. These clamping bolts 16 extend through the inner ends of the spokes 10 of the wheel and have clamping nuts 17 on their free ends. Clamped between the heads of the bolts 16 and the inner edge of the cylindrical member 13 is a pair of spaced annular plates 18 and 19, the latter being disposed on opposite sides of the before mentioned plate 7. The plate 19 is provided with an annular groove or channel 20 in its interior side, and disposed within the channel 20 is suitable packing material 21. By this construction it may be seen that the plate 7 will slide between the two plates 18 and 19 whenever the rim 18 of the wheel is moved eccentrically with respect to the hub portion 4. The packing 21 prevents dust and dirt from gaining entrance to the interior of the hub and also prevents oil or other lubricant from finding its way to the exterior of the same.

The plate 6 is disposed between the annular plate 12 secured to the outer sides of the spokes 10 and a plate 22, which is secured to the spokes 10 by means of the clamping bolts 16. The central portion of this plate 22 is offset outwardly for the purpose of ornamentation as well as to prevent the same from coming into contact with the end of the axle 1 and the nut 2 threaded to the same. The plate 22 is spaced a short distance from the spokes 10 by any suitable means.

From the description so far, it may be seen that the rim 8 may be moved eccentrically with respect to the axle 1 or hub portion 4, the plates 6 and 7 sliding between the plates 12 and 22, and 18 and 19 respectively. The following means is, however, to be employed for maintaining the rim in its normal position with respect to the hub portion and to provide the proper cushioning effect.

The means above referred to comprises an inner rim 23 which is preferably made in two sections 24 and 25 as clearly shown in Fig. 3 of the drawings. These sections 24 and 25 are secured to the spokes 10 in any suitable manner, but preferably by a plurality of bolts or rivets 25′, the latter also extending through the annular plates 12 and assisting in clamping these sections to said spokes. The abutting edges of the sections 24 and 25 are notched out to form slots 26 in the inner rim through which the lugs 27 which extend outwardly from the outer sides of a plurality of circumferentially curved blocks 28, extend. These blocks 28 are substantially rectangular in configuration and are provided at their central portion with openings 29 through which the spokes 5 carried by the hub portion 4 extend.

As clearly shown by Fig. 7 of the drawings, the lugs 27 are disposed adjacent one of the edges of the openings 29 so that said lugs rest against the spokes 5. The inner sides of the blocks 28 are provided with sockets or recesses 30 which are in effect seats for the outer ends of a plurality of coiled springs 31, the latter surrounding the spokes 5 and having their inner ends resting against the flat sides of the hub portion 4. By this construction it may be seen that the inner rim 23 and consequently the outer rim 8 will be maintained in substantially concentric relation with respect to the axle 1 and hub portion 4, but it is yieldably mounted with respect to these parts so that when pressure is exerted upon the same it will yield. The springs 31 herein referred to, for the sake of clearness, will be named the main springs.

Extending from the ends of the blocks 28 carrying the lugs 27 and arranged concentrically with respect to said hub portion are circumferentially curved stems 32. These stems 32 are guided in suitable apertures arranged in lugs 33, which extend inwardly from the inner sides of the rim 23. As shown in Figs. 3 and 4 of the drawings, the lugs 33 are arranged substantially in circumferential alinement with the slots 26 to afford this engagement with the stems 32.

Surrounding the stems 32 are circumferentially extending coiled springs 34, one of the ends of which rest against the adjacent ends of the blocks 28, while their other ends rest against the adjacent sides of the lugs 33. Contacting with the other sides of the lugs 33 at one of their ends are circumferentially extending oppositely disposed coiled springs 35, the other ends of which contact with the other ends of the blocks 28. The springs 34 are stronger than the springs 35, and will overbalance the force exerted by the latter upon the lugs 33 to maintain the spokes 5 normally resting against one of the ends of the slots 26.

As hereinbefore explained, the subject matter of the present invention is preferably to be employed in connection with the driving axle of motor driven vehicles, and the specific form of the invention illustrated in the drawings is the right driving wheel of the same. When power is imparted to the axle 1 the hub portion 4 will be rotated in an anticlockwise direction, reference being had to Figs. 1 and 4, and this in turn will rotate the rim carrying the tire. However, as the rims 8 and 23 are yieldably connected to the hub by means of coiled springs, the former will move circumferentially with respect to the latter, depending upon the weight of the body of the vehicle, the power applied to the axle, and the resistance offered against the rotation of the wheel by its frictional engagement with the ground. Therefore, the coiled springs 34 will be put under greater compression than before. Also any uneven shock or jar exerted upon the wheel will not be so strongly imparted to the driving parts of the vehicle.

It is obvious that as the spokes 5 and the blocks 28 are moved circumferentially with respect to the rim 23, the coiled spring 35 will expand. Then, as the speed of the vehicle slows down and comes completely at rest, the larger and stronger springs 34 will overbalance the force exerted upon the lugs 33 in the opposite direction, while the springs 35 and the spokes and blocks resume their normal position. It will be seen that the ends of the slots 26 are in effect stops for limiting the movement of the blocks and spokes, and the springs 35 act as rebound cushions to prevent injury to the parts when the blocks and spokes move to their normal positions with respect to the slots.

In addition to the function which the springs 34 and 35 have in preventing injury to the driving mechanism of the vehicle, these springs also bear part of the weight of the body of the vehicle. The main part of this weight, however, is borne by the main springs 31, and in this connection it may be seen that the inner and outer rims 8 and 23 are yieldably mounted with respect to the hub portion 4, but may be moved eccentrically of the same.

From the foregoing description, taken in connection with the accompanying drawings, the construction and operation of the device will be readily understood without a more extended explanation.

As numerous changes in form, proportion, and in the minor details of construction may be resorted to without departing from the spirit of this invention, I do not wish to be limited to the construction herein shown and described other than that set forth in the appended claim.

I claim:

A wheel of the class described including a rim having a plurality of circumferentially extending slots and a plurality of inwardly extending apertured lugs arranged between such slots and in circumferential alinement with the same, a hub having a plurality of radial spokes projecting therefrom and extending through said slots, circumferentially curved rectangular blocks slidably mounted upon said spokes and having lugs projecting outwardly from the outer sides thereof and extending into said slots for slidable engagement with the latter, circumferentially curved stems extending from one end only of said blocks and slidable through the apertures in the lugs of said rim, coiled springs surrounding said stems and disposed between one of the ends of the last referred to lugs and said blocks to maintain the latter, together with said spokes, normally at one end of said slots, smaller and weaker coiled springs disposed between the other end of the last referred to lugs and said blocks to prevent sudden injurious contact between said spokes and the herein mentioned ends of said slots when said spokes resume their normal positions, and means for yieldably maintaining said rim concentric with said hub.

In testimony whereof I have hereunto set my hand in the presence of two subscribing witnesses.

JAMES EDWARD ROGERS.

Witnesses:
 WILBER PATTERSON,
 ELMER PATTERSON.

Copies of this patent may be obtained for five cents each, by addressing the "Commissioner of Patents, Washington, D. C."